US012596434B2

(12) United States Patent
Horikiri

(10) Patent No.: US 12,596,434 B2
(45) Date of Patent: Apr. 7, 2026

(54) BRAIN INFORMATION TRANSMISSION SYSTEM AND BRAIN INFORMATION TRANSMISSION METHOD

(71) Applicant: JVCKENWOOD Corporation, Yokohama (JP)

(72) Inventor: Kazuki Horikiri, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/743,191

(22) Filed: Jun. 14, 2024

(65) Prior Publication Data

US 2024/0338077 A1     Oct. 10, 2024

Related U.S. Application Data

(63) Continuation of application No. PCT/JP2022/034178, filed on Sep. 13, 2022.

(30) Foreign Application Priority Data

Dec. 23, 2021     (JP) ................................. 2021-209664

(51) Int. Cl.
*G06F 3/01* (2006.01)
(52) U.S. Cl.
CPC .................................... *G06F 3/015* (2013.01)
(58) Field of Classification Search
CPC . G06F 3/01; G06F 3/015; A61B 5/369; A61B 5/165
USPC ........................................................ 345/156
See application file for complete search history.

(56) References Cited

U.S. PATENT DOCUMENTS

| | | | |
|---|---|---|---|
| 12,118,148 B1 * | 10/2024 | Ziv ..................... | H04M 1/7243 |
| 2015/0332016 A1 | 11/2015 | Kamitani et al. | |
| 2016/0103487 A1 * | 4/2016 | Crawford ............... | A61B 5/117 |
| | | | 600/544 |
| 2022/0133194 A1 * | 5/2022 | Bach ................... | A61B 5/6801 |
| | | | 600/544 |
| 2023/0163637 A1 * | 5/2023 | Smith .................. | H04W 12/63 |
| | | | 307/104 |
| 2024/0176421 A1 * | 5/2024 | Lee ......................... | G10L 15/02 |

FOREIGN PATENT DOCUMENTS

| | | |
|---|---|---|
| JP | 2008-278903 | 11/2008 |
| JP | 2014-092561 | 5/2014 |
| JP | 2016-212772 | 12/2016 |
| JP | 2017-127499 | 7/2017 |
| WO | 2014/092045 | 6/2014 |

OTHER PUBLICATIONS

International Search Report and Written Opinion for International Application Serial No. PCT/JP2022/034178 mailed on Nov. 29, 2022, 8 pages.

* cited by examiner

*Primary Examiner* — Calvin C Ma
(74) *Attorney, Agent, or Firm* — Amin, Turocy & Watson, LLP

(57) ABSTRACT
A brain information transmission system is a brain information transmission system that includes a plurality of BMI devices each of which performs intention conveyance based on brain information among a plurality of users, and includes a processing unit configured to calculate a processing capacity of each of the users with respect to the brain information based on a degree of activity of the brain of each of the users indicated when a common stimulus is provided to the brain of each of the users.

7 Claims, 8 Drawing Sheets

SIGNAL VALUE

TIME

TIME

TIME

TIME

FIG.7

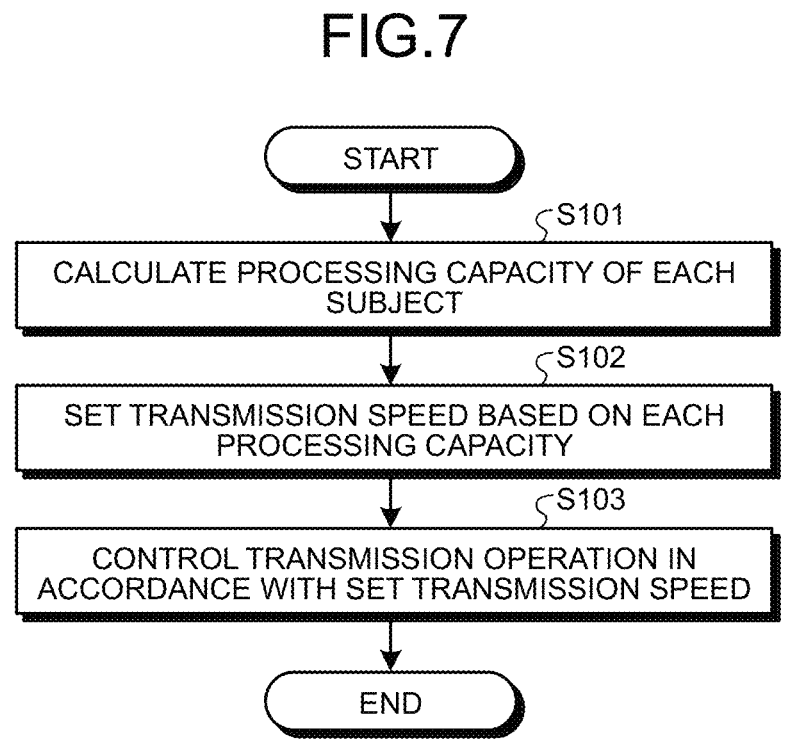

START

S101

CALCULATE PROCESSING CAPACITY OF EACH SUBJECT

S102

SET TRANSMISSION SPEED BASED ON EACH PROCESSING CAPACITY

S103

CONTROL TRANSMISSION OPERATION IN ACCORDANCE WITH SET TRANSMISSION SPEED

END

BRAIN INFORMATION TRANSMISSION SYSTEM AND BRAIN INFORMATION TRANSMISSION METHOD

CROSS-REFERENCE TO RELATED APPLICATIONS

This application is a Continuation of International Application No. PCT/JP2022/034178, filed on Sep. 13, 2022, which designates the United States, incorporated herein by reference, and which claims the benefit of priority from Japanese Patent Application No. 2021-209664, filed on Dec. 23, 2021, incorporated herein by reference.

BACKGROUND

The present disclosure relates to a brain information transmission system.

In recent years, techniques, such as a functional magnetic resonance technique and near-infrared spectroscopy, for measuring intra-brain activation information in a non-invasive manner have been developed, and the technology related to a brain-machine interface (BMI) that is an interface between the brain and the outside is becoming more realistic. As an example using this type of technology, there is a disclosed intention conveyance support device that computes information for specifying a visual stimulus imaged by a subject on the basis of information that includes both a feature value derived from a brain surface signal and a feature value derived from an intra-brain signal (for example, see Japanese Laid-open Patent Publication No. 2014-92561).

In the case where intention conveyance is performed on the basis of brain information among a plurality of users, when the brain information is input to the brain of the user, if an amount of information per unit time is too large with respect to the processing capacity of the user, there is a possibility that the intention conveyance do not smoothly performed in real time.

SUMMARY

A brain information transmission system according to an aspect of the present disclosure includes a plurality of BMI devices each of which performs intention conveyance based on brain information among a plurality of users, and includes a processing unit configured to calculate a processing capacity of each of the users with respect to the brain information based on a degree of activity of a brain of each of the users indicated when a common stimulus is provided to the brain of each of the users.

BRIEF DESCRIPTION OF THE DRAWINGS

FIG. 7 is a flowchart illustrating the flow of operation performed in the brain information transmission system.

DETAILED DESCRIPTION

Preferred embodiments of a brain information transmission system according to the present disclosure will be explained with reference to the accompanying drawings. Furthermore, the present invention is not limited to the embodiments described below. Furthermore, the components described in the embodiment include one that can easily be replaced by those skilled in the art or one that is substantially identical.

Figure 1:
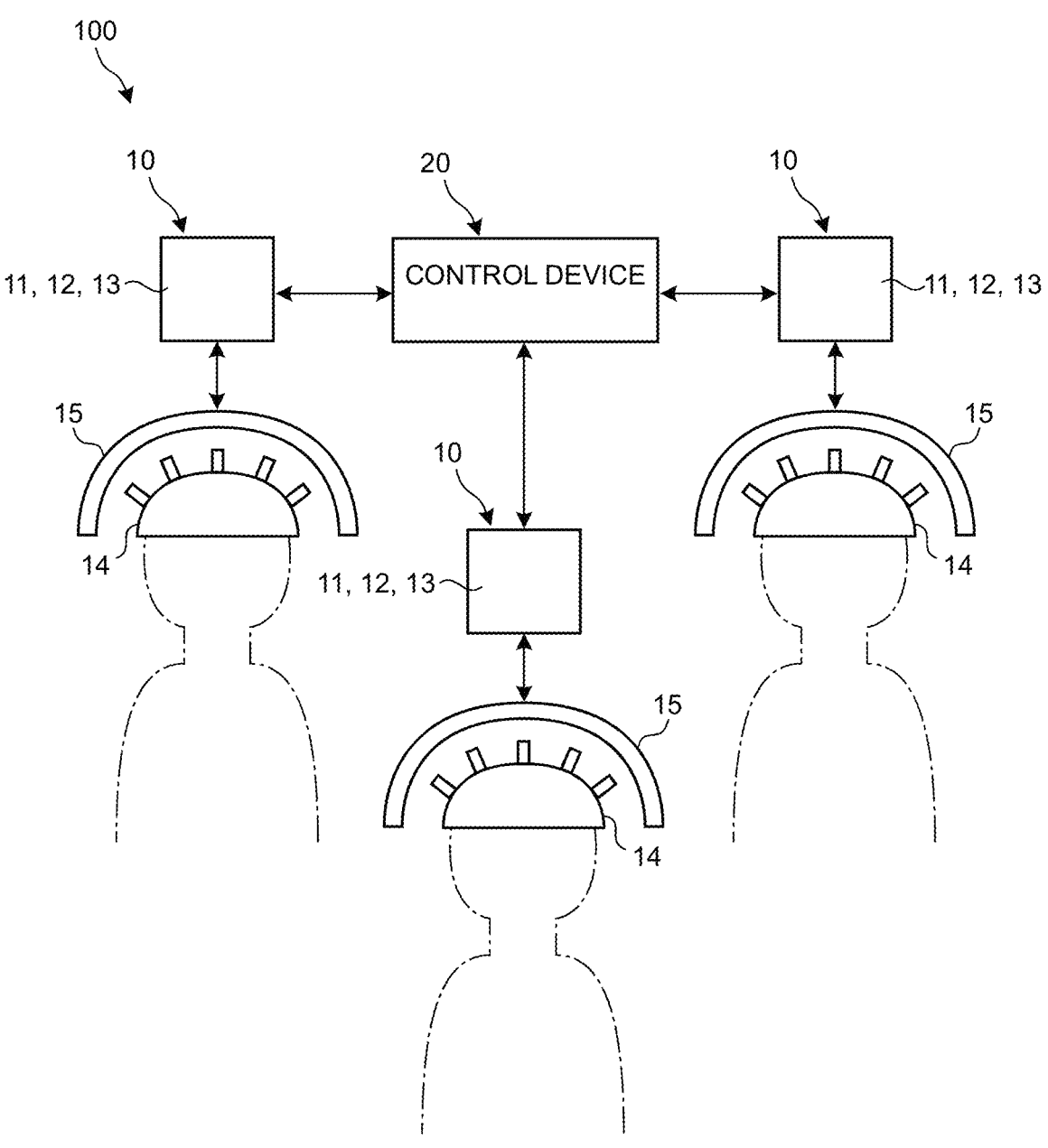
FIG. 1 is a schematic diagram illustrating one example of a brain information transmission system according to a present embodiment.
Figure 2:
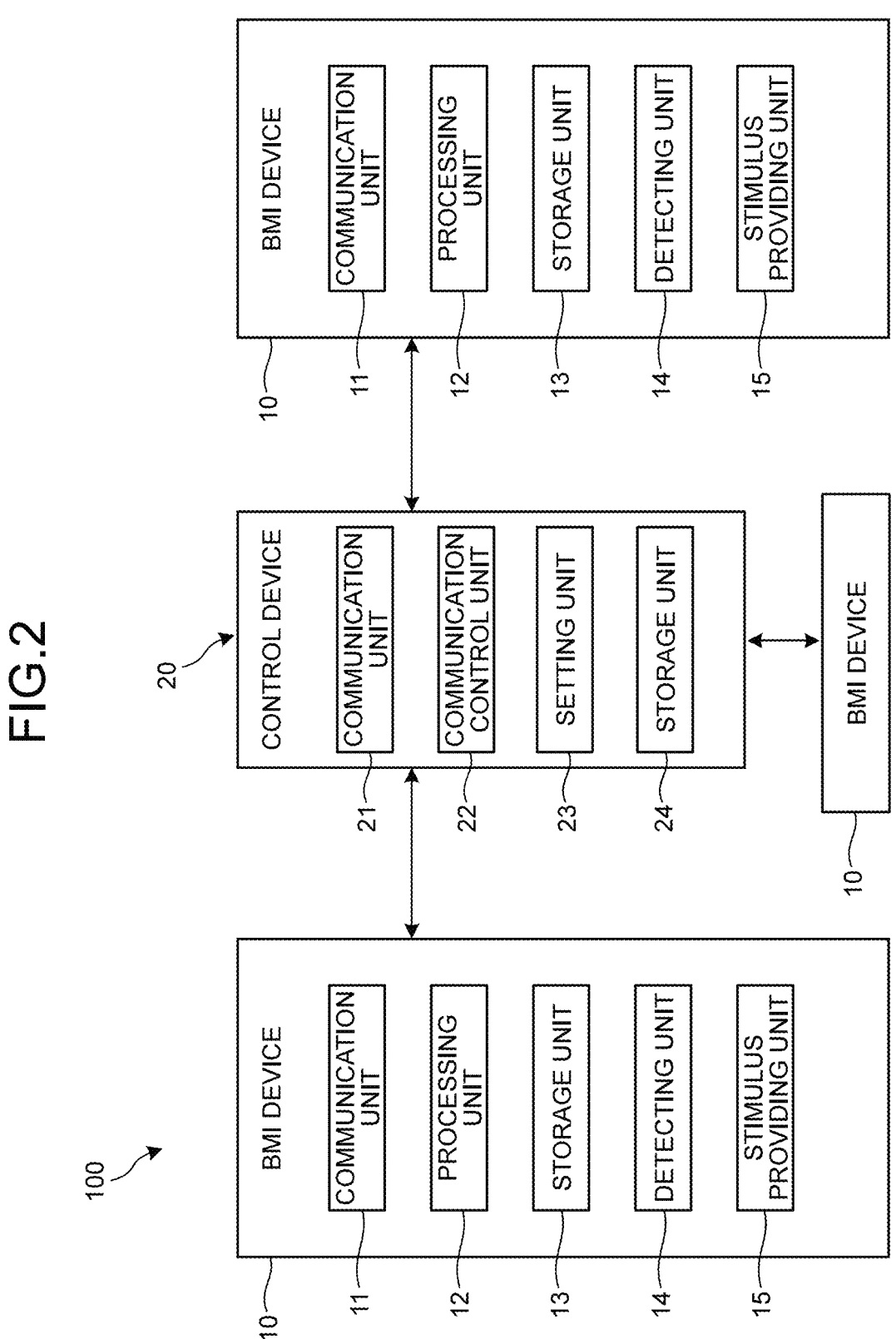
FIG. 2 is a functional block diagram illustrating one example of the brain information transmission system.

FIG. 1 is a schematic diagram illustrating one example of a brain information transmission system 100 according to the present embodiment. FIG. 2 is a functional block diagram illustrating one example of the brain information transmission system 100. As illustrated in FIG. 1 and FIG. 2, the brain information transmission system 100 performs intention conveyance on the basis of brain information among a plurality of users. The intention conveyance performed on the basis of the brain information includes a process of converting an intention, an emotion, and a sense of each of the users to data and a process of transmitting the data. The brain information transmission system 100 includes a plurality of BMI devices 10 and a control device 20.

The BMI device 10 is an interface between the brain and the outside using a brain-machine interface (BMI) technology. Each of the BMI device 10 includes a communication unit 11, a processing unit 12, and a storage unit 13. The communication unit 11 transmits and receives information. The communication unit 11 transmits, to the control device 20, various kinds of information including the brain information that is acquired from the brain of each of the users and information on the processing capacity of each of the users with respect to the brain information, which will be described later. The communication unit 11 receives various kinds of information including the brain information that is stored in another user and that is transmitted from the control device 20. The brain information is information that includes brain activation information and stimulus information, which will be described later.

The processing unit 12 controls a communication operation performed in the communication unit 11. The processing unit 12 acquires the brain information that is detected by a detecting unit 14. In the present embodiment, the detecting unit 14 detects, for example, brain activation information as the brain information. Examples of the intra-brain activation information include concentration of an oxygenated hemoglobin concentration, a deoxidized hemoglobin concentration, a total hemoglobin concentration that are included in the cerebral blood flow of, for example, a user. Examples of the detecting unit 14 that may be used include a measuring device for performing measurement on the basis of the principles of, for example, functional magnetic resonance imaging (fMRI) or functional near-infrared spectroscopy (fNIRS), a measuring device using invasive electrodes, a measuring device for performing measurement by using micromachine arranged in a cerebral blood vessel, and the like. Furthermore, the detecting unit 14 is not limited to the above described devices, and another type of device may also be used. In the case where, for example, the brain of a user is divided into sections on the basis of a three-dimensional matrix constituted by voxels each having the size of a few millimeters or less, the intra-brain activation information is able to be indicated as the magnitude of the degree of activity for each voxel.

The processing unit 12 generates, on the basis of the acquired brain activation information, stimulus information for providing a stimulus to the brain of the other user by a stimulus providing unit 15. The processing unit 12 extracts an intention, an emotion, and a sense of the user as data, by analyzing, for example, the brain activation information, and generates the stimulus information that provides a stimulus that allows the other user to recall an intention, an emotion, and a sense. In this case, it may be possible to store the brain activation information in an associated manner with an intention, an emotion, and a sense, and store the stimulus information in an associated manner with an intention, an emotion, and a sense in the storage unit 13. Furthermore, the processing unit 12 supplies the stimulus information that has been extracted from the brain information stored in the other user received by the communication unit 11 to the stimulus providing unit 15.

The stimulus providing unit 15 provides a stimulus to the user by activating a target portion by irradiating the target portion of the brain of the user with an electromagnetic wave signal. The stimulus providing unit 15 divides the brain of the user into sections on the basis of the three-dimensional matrix constituted by, for example, voxels each having the size of a few millimeters or less, and irradiates the brain of the user with electromagnetic waves for each voxel. The stimulus information includes information indicating which voxel included in the three-dimensional matrix is to be irradiated with electromagnetic waves of what intensity. Sizes and positions of voxels in the three-dimensional matrix of the stimulus information may correspond to the sizes and position of voxels included in a three-dimensional matrix of, for example, the intra-brain activation information. As for what kind of an intention, an emotion, and a sense are generated when which voxel of the brain of the user is irradiated with electromagnetic waves of what intensity, it is possible to obtain an association relationship by performing experiments in advance. For example, it is possible to generate a learning model that is obtained by performing machine learning on learning data sets that are obtained by associating the stimulus information with respect to the user with an intention, an emotion, and a sense that are generated in the brain of the user as a single learning data set in the case where the brain is irradiated with electromagnetic waves on the basis of the stimulus information. The learning model is able to be stored in, for example, the storage unit 13 included in the BMI device 10.

Figure 3:
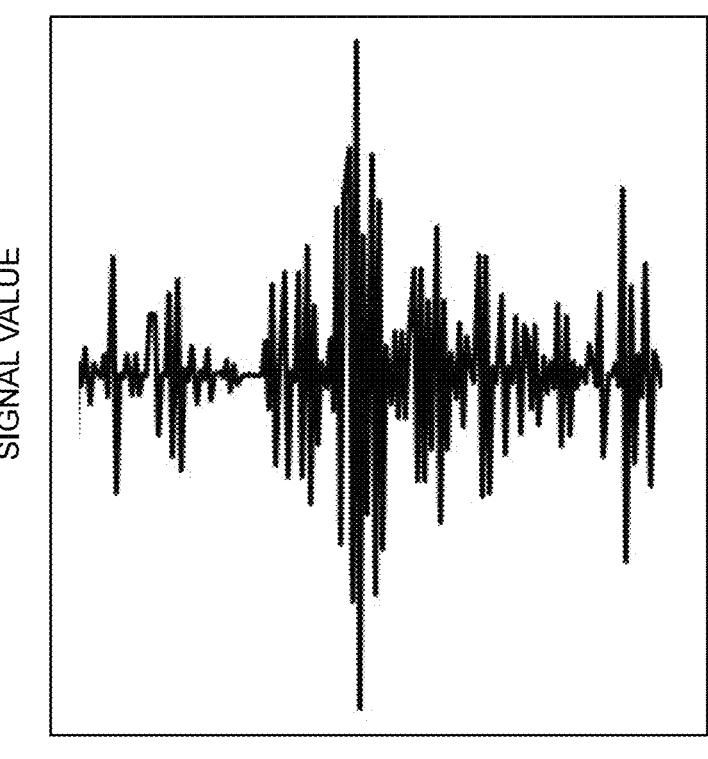
FIG. 3 is a diagram illustrating one example of a sense of hearing stimulus pulse that is provided to a user.

Furthermore, the stimulus providing unit 15 is able to provide a common stimulus to the brain of each of the users in order to measure the processing capacity of the respective users with respect to the brain information, which will be described later. As one example, the stimulus providing unit 15 is able to provide a stimulus to the user by using a sense of hearing stimulus pulse. FIG. 3 is a diagram illustrating one example of the sense of hearing stimulus pulse that is provided to the user. In FIG. 3, the horizontal axis indicates time, whereas the vertical axis indicates signal values. By providing the sense of hearing stimulus pulse illustrated in FIG. 3, a portion of the brain related to a sense of hearing of the user becomes activated. In this case, the intra-brain activation information stored in the user is able to be acquired by the detecting unit 14. The stimulus providing unit 15 may also periodically provide a sense of hearing stimulus pulse during a period of, for example, intention conveyance performed among a plurality of users. In this case, the processing capacity of each of the users with respect to the brain information is periodically needed.

Figure 4A:
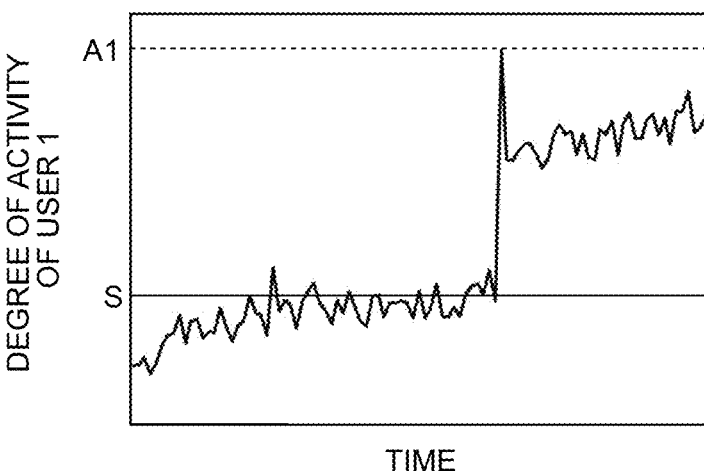
FIG. 4 are diagrams each illustrating an example of a degree of activity of each of the users obtained when the sense of hearing stimulus pulse illustrated in FIG. 3 is provided to different users.
Figure 4B:
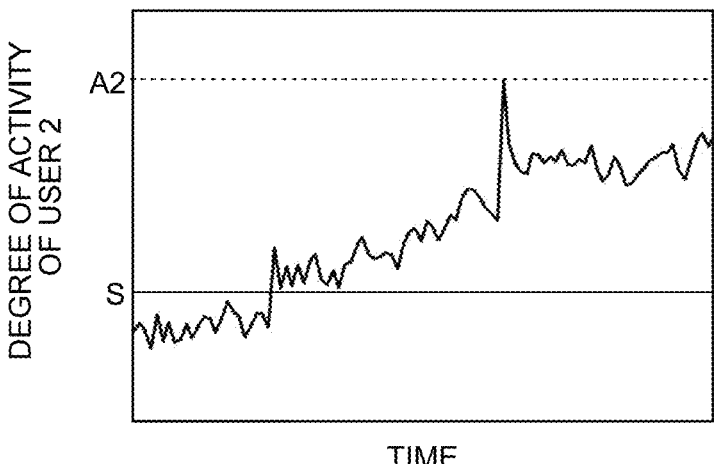
Figure 4C:
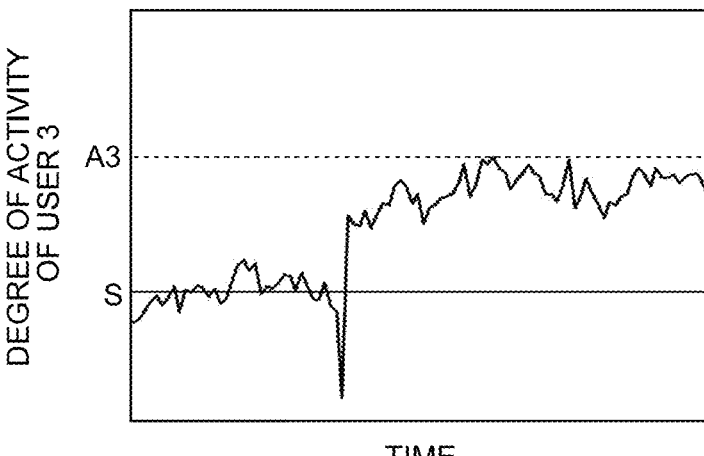

The processing unit 12 calculates the degree of activity of the user on the basis of the intra-brain activation information acquired by the detecting unit 14 at the time of measurement of the processing capacity of the user. FIG. 4 are diagrams each illustrating an example of the degree of activity of the each of the users obtained when the sense of hearing stimulus pulse illustrated in FIG. 3 is provided to different users. In FIG. 4, the horizontal axis indicates time, whereas the vertical axis indicates the degree of activity. Moreover, the horizontal axis (time axis) illustrated in FIG. 4 agrees with the horizontal axis (time axis) illustrated in FIG. 3. As illustrated in FIG. 4, the processing unit 12 defines a relaxed state of the user to whom a stimulus is not provided as a stationary state. The processing unit 12 defines the degree of activity in the stationary state as a reference value S, and is able to calculate the processing capacity of the user on the basis of the peak value of the degree of activity indicated when a sense of hearing stimulus is provided. In the example of a user 1 indicated by (a) illustrated in FIG. 4, the peak value of the degree of activity is A1, in the example of a user 2 indicated by (b) illustrated in FIG. 4, the peak value of the degree of activity is A2, and in the example of a user 3 indicated by (c) illustrated in FIG. 4, the peak value of the degree of activity is A3. It is possible to obtain in advance such peak values of the degree of activity as the values each of which indicates the processing capacity, and it is possible to store the peak values in a storage unit 16. In this case, the processing unit 12 is able to easily calculate the processing capacity corresponding to the degree of activity by using the data stored in the storage unit 16. In the following, one example of a process of determining the processing capacity performed by the processing unit 12 will be described. For example, the degree of activity of each of the user 1 and the user 2 is increased at the same timing. When the processing capacity is calculated on the basis of the peak value of the degree of activity, the peak value A1 of the user 1 is higher than the peak value A2 of the user 2, so that it is possible to determine that the processing capacity of the user 1 is higher than that of the user 2.

Furthermore, the processing unit 12 is able to calculate the processing capacity of the user on the basis of an earlier start time of a rise in the degree of activity. As compared with the user 1 and the user 2, the peak value of the degree of activity is low in the user 3, whereas the degree of activity of the user 3 is increased at earlier timing indicated by the time axis than the timing of an increase in the degree of activity exhibited by each of the user 1 and the user 2. Specifically, the degree of activity is increased with a small pulse at a time point before the sense of hearing stimulus pulse indicates the maximum amplitude. Accordingly, when the processing capacity is calculated on the basis of the reaction speed of the stimulus, it is possible to determine that the processing capacity of the user 3 is higher than that of each of the user 1 and the user 2. Moreover, the processing capacity may be calculated on the basis of one of the peak value and the earlier start time of a rise in the degree of activity, or may be calculated on the basis of the indices that are calculated from both. Furthermore, the common stimulus for measuring the processing capacity of the user with respect to the brain information is not limited to the sense of hearing stimulus, but another stimulus, such as a visual stimulus, may be used.

The processing unit 12 allows the obtained value of the processing capacity to be transmitted from the communication unit 11. The processing unit 12 is able to allow, for example, the communication unit 11 to transmit the obtained processing capacity to the control device 20. In this case, in the control device 20, as will be described later, the transmission speed of the brain information is set on the basis of the processing capacity for each user. The set transmission speed is transmitted from the control device 20 to each of the BMI devices 10. Furthermore, the processing unit 12 may also allow, for example, the communication unit 11 to broadcast the obtained processing capacity to each of the BMI devices 10. In the case where the processing capacity is broadcasted, the processing unit 12 is able to use H.323 that is the protocol for performing voice and moving image communication in real time. In this case, it is possible to broadcast the processing capacity of each of the users with respect to the brain information by using a terminal capability set (TCS) that is a communication control message for performing mutual acknowledgement of the ability of each of the terminals of the respective BMI devices 10.

The processing unit 12 controls the transmission operation of transmitting the brain information to be transmitted from the communication unit 11 so as to be equivalent to the set value of the transmission speed transmitted from the control device 20. The processing unit 12 is able to control the transmission speed by inserting, for example, invalid information into the brain information that is transmitted and received. In the case where the invalid information is inserted into the brain information and is transmitted and received, an amount of information related to the brain information that is transmitted and received per unit time is decreased. Accordingly, it is possible to easily set the transmission speed to the transmission speed of the user whose processing capacity is low. The processing unit 12 allows the generated stimulus information to be transmitted from the communication unit 11 to the control device 20 as the brain information.

The storage unit 13 stores therein various kinds of information. The storage unit 13 includes a storage, such as a hard disk drive or a solid state drive. Furthermore, as the storage unit 13, an external storage medium, such as a removable disk, may be used. The storage unit 13 stores therein the processing capacity of each of the users with respect to the brain information that is transmitted from, for example, the control device 20 or that is broadcasted from the communication unit 11 included in each of the BMI devices 10 that are used by the respective users.

The control device 20 controls the plurality of BMI devices 10. The control device 20 includes a communication unit 21, a communication control unit 22, a setting unit 23, and a storage unit 24. The communication unit 21 is an interface for performing wire communication or wireless communication. The communication unit 21 receives the brain information that is transmitted from each of the BMI devices 10 and the value of the processing capacity of each of the users. The communication unit 21 transmits the received brain information to the associated BMI device 10.

The communication control unit 22 controls the communication operation performed in the communication unit 21.

The setting unit 23 allows the brain information received by the communication unit 21 to be transferred to the other BMI device 10 that is different from the BMI device 10 that corresponds to the sending source.

The setting unit 23 sets the transmission speed of the brain information between the BMI devices 10 on the basis of the value of the processing capacity of each of the users received by the communication unit 21. It is estimated that the user having a relatively high value of the processing capacity of the brain information stores therein a relatively larger amount of information related to the brain information that is able to be processed per unit time. Furthermore, it is estimated that the user having a relatively low processing capacity of the brain information stores therein a relatively small amount of information related to the brain information that is able to be processed per unit time. In the case where the brain information is input to the brain of the user, if an amount of the information per unit time is too large with respect to the processing capacity, the process is not likely to smoothly proceed in real time. In the present embodiment, the setting unit 23 is able to set the transmission speed in which all of the users are able to smoothly perform the processes in real time by setting the transmission speed such that an amount of information related to the brain information transmitted per unit time is equal. The setting unit 23 may set the transmission speed to a transmission speed equivalent to the transmission speed of the user who has the lowest value of the processing capacity, or may set the transmission speed to a transmission speed that is lower than the transmission speed equivalent to the transmission speed of the user who has the lowest value of the processing capacity.

The storage unit 24 stores therein various kinds of information. The storage unit 24 includes a storage, such as a hard disk drive, or a solid state drive. Furthermore, an external storage medium, such as a removable disk, may be used as the storage unit 24.

In the following, one example of an operation of the brain information transmission system 100 having the configuration described above will be described. In the example described below, a case will be described as an example in which intention conveyance is performed on the basis of the brain information between two users of a first user A and a second user B. Moreover, the same explanation is also available in the case where intention conveyance is performed on the basis of the brain information among three or more users.

First, in each of the BMI devices 10, the processing unit 12 acquires the degree of activity of the brain of each of the users in the case where a common stimulus is provided to each of the first user A and the second user B. The processing unit 12 is able to provide a stimulus to each of the first user A and the second user B in advance. The processing unit 12 calculates the processing capacity of the user with respect to the brain information on the basis of the acquired degree of activity. The processing unit 12 allows the communication unit 11 to transmit the value of the processing capacity that is the obtained result to the control device 20. Moreover, the processing unit 12 may also allow the communication unit 11 to broadcast the value of the processing capacity that is the obtained result to the other BMI device 10.

In the control device 20, the communication unit 21 receives the value of the processing capacity acquired from each of the BMI devices 10. The setting unit 23 sets, on the basis of the received value of each of the processing capacities, the transmission speed of the brain information that is transmitted between the two BMI devices 10. In this case, the setting unit 23 may set the transmission speed to the transmission speed associated with the user who has the lowest value of the processing capacity, or may set the transmission speed to the transmission speed that is lower than the transmission speed associated with the user who has the lowest value of the processing capacity. The setting unit 23 allows the communication unit 21 to transmit the set value of the transmission speed to each of the BMI devices 10.

Figure 5:
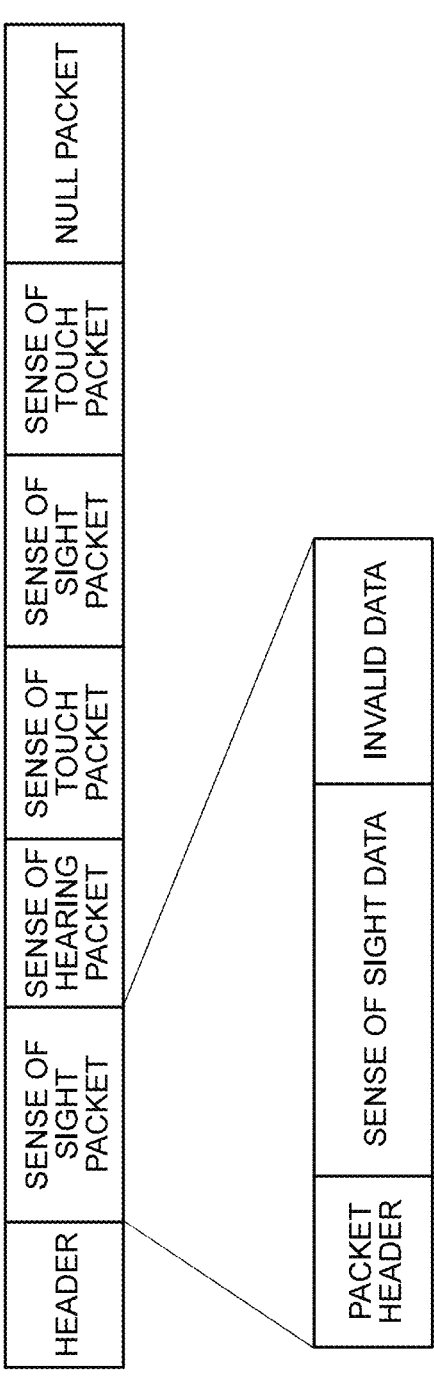
FIG. 5 is a diagram schematically illustrating one example of stimulus information that is generated by a processing unit.

The processing unit 12 generates, on the basis of the set value of the transmission speed transmitted from the control device 20, stimulus information that is to be transmitted to the control device 20. FIG. 5 is a diagram schematically illustrating one example of the stimulus information that is generated in the processing unit 12. As illustrated in FIG. 5, the processing unit 12 packetizes the stimulus information for, for example, each sense, such as a sense of sight, a sense of hearing, a sense of touch, a sense of taste, a sense of smell, and a somatic sensation. The size of each of the packets may be set to a value that is set in advance. For example, a sense of sight packet includes a packet header, sense of sight data, and invalid data. The same configuration may be used for the packets of the other senses.

The processing unit 12 performs time division multiplexing on each of the packets generated for the plurality of senses, the processing unit 12 is able to generate stimulus information on the plurality of senses as a single piece of information. When the processing unit 12 multiplexes the pieces of stimulus information, the processing unit 12 is able to use the technology conforming to the multiplexing standard that is the same standard as the moving picture experts group (MPEG) standard used when, for example, an elementary stream is packetized. In this case, it is preferable that the processing unit 12 performs multiplexing in the form of, for example, program streams, but the processing unit 12 may also perform multiplexing in the form of transport streams.

Figures 6A, 6B:
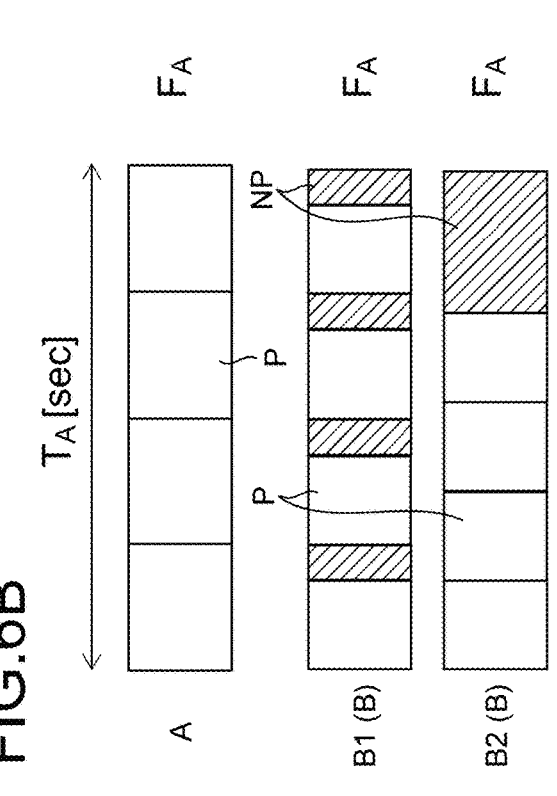
FIG. 6 is a diagram schematically illustrating one example of control of a transmission operation of transmitting brain information.

The processing unit 12 allows the pieces of stimulus information that are packetized for each sense to be synchronized by, for example, a signal, such as a reference clock. At this time, the processing unit 12 adjusts, on the basis of the set value of the transmission speed received from the control device 20, an amount of information related to the stimulus information that is transmitted per unit time. FIG. 6 is a diagram schematically illustrating one example of a process of controlling the transmission operation of transmitting the brain information. FIG. 6 (*a*) indicates one example of a transmission speed and transmission time of each of the first user A and the second user B. As illustrated in FIG. 6 (*a*), it is assumed that the first user A has the processing capacity corresponding to a transmission speed $F_A$ and the second user B has the processing capacity corresponding to a transmission speed $F_B$. Each of the transmission speeds $F_A$ and $F_B$ is calculated on the basis of transmission time $T_A$ and $T_B$, respectively, at the time at which N packets P each having the same amount of information are transmitted. Here, the transmission time is represented by $T_A{>}T_B$. In other words, it is assumed that the transmission speed is represented $F_A{<}F_B$, and the second user B has the processing capacity that is higher than that of the first user A. In this case, in the control device 20, the transmission speed is set so as to conform to the processing capacity of the first user A that is a relatively low processing capacity and is set so as to have the same amount of information related to the brain information transmitted per unit time.

FIG. 6 (*b*) illustrates one example of a process of controlling the transmission operation performed in the case where the set value of the transmission speed is $F_A$. As illustrated in FIG. 6 (*b*), in the case where the set value of the transmission speed is $F_A$, in the BMI device 10 that is used by the first user A, it is possible to transmit the brain information without inserting the invalid information. Furthermore, in the BMI device 10 that is used by the second user B, the invalid information, such as a null packet NP, is inserted such that the transmission speed becomes $F_A$. In the BMI device 10 that is used by the second user B, as illustrated in the middle part indicated by (B1) illustrated in FIG. 6 (*b*), invalid data may be inserted into a single packet as the invalid information. Furthermore, as illustrated in the lower part indicated by (B2) illustrated in FIG. 6 (*b*), a null packet may be inserted in the plurality of packets P as invalid information in units of packets.

FIG. 6 (*c*) illustrated an example of a process of controlling the transmission operation performed in the case where the set value of the transmission speed is Fc that is lower than $F_A$. As illustrated in FIG. 6 (*c*), in the case where the set value of the transmission speed is Fc that is lower than $F_A$, in the BMI device 10 that is used by the first user A and in the BMI device 10 that is used by the second user B, the invalid information, such as a null packet NP or invalid data, is inserted such that each of the transmission speeds becomes Fc.

The processing unit 12 is able to control the transmission speed by inserting the invalid information, such as a null packet, between, for example, the packets P of the brain information to be transmitted. When the invalid information is inserted into the brain information and transmitted and received, the amount of information related to the brain information that is transmitted and received per unit time is reduced. Consequently, it is possible to easily set the transmission speed of the user whose processing capacity is low.

The processing unit 12 may only adjust the entire transmission speed of the brain information to be transmitted. The processing unit 12 is able to appropriately set, for example, the timing of insertion of the packet of the invalid information and the amount of information related to the invalid information for each packet as long as the entire transmission speed of the brain information is an appropriate transmission speed. The processing unit 12 allows the control device 20 to transmit the generated brain information from the communication unit 11.

In the control device 20, the brain information is received by the communication unit 21. The received brain information is transferred to the other BMI device 10 by the communication control unit 22.

In the other BMI device 10, the brain information that has been transferred by the control device 20 is received by the communication unit 11. As a result of this, the brain information is transferred between the BMI devices 10 at the transmission speed corresponding to the set value of the transmission speed that has been set by the control device 20. The processing unit 12 supplies the received brain information to the stimulus providing unit 15. The stimulus providing unit 15 provides the stimulus corresponding to the supplied brain information to the second user B. The second user B is able to vicariously experience an intention, an emotion, and a sense, or the like recalled by the first user A by a stimulus provided from the stimulus providing unit 15.

FIG. 7 is a flowchart illustrating the flow of the process performed in the brain information transmission system 100. As illustrated in FIG. 7, the processing unit 12 included in each of the BMI devices 10 calculates the processing capacity of the user with respect to the brain information on the basis of the degree of activity of the brain of the user in the case where a common stimulus is provided to the brain of each of the users (Step S101).

Then, the setting unit 23 included in the control device 20 sets, on the basis of the processing capacity of the user with respect to the brain information, the transmission speed of the brain information between the plurality of BMI devices 10 (Step S102).

Then, in each of the BMI devices 10, the processing unit 12 generates the brain information in which, for example, the invalid information is inserted, and controls the transmission operation of transmitting the generated brain information or the like in accordance with the set transmission speed (Step S103).

As described above, the brain information transmission system 100 according to the present embodiment is the brain information transmission system 100 that includes the plurality of BMI devices 10 each of which performs intention conveyance on the basis of the brain information among the plurality of users, and includes the processing unit 12 that calculates the processing capacity of each of the users with respect to the brain information on the basis of the degree of activity of the brain of each of the users indicated in the case where a common stimulus is provided to the brain of each of the users.

According to this configuration, the processing capacity of the user with respect to the brain information is calculated on the basis of the degree of activity of the brain of each of the users indicated in the case where the common stimulus is provided to the brain of each of the users, so that it is possible to appropriately grasp the processing capacity of each of the users with respect to the brain information in the case where the intention conveyance is performed among the plurality of users on the basis of the brain information.

The brain information transmission system 100 according to the present embodiment further includes the setting unit 23 that sets the transmission speed of the brain information transmitted among the plurality of BMI devices 10 on the basis of the processing capacity of the user with respect to the brain information. According to this configuration, the transmission speed of the brain information among the plurality of BMI devices 10 is set on the basis of the processing capacity of the user with respect to the brain information, it is possible to smoothly perform the intention conveyance in real time even in the case where there is a difference between the processing capacities of the brain information stored in the users.

In the brain information transmission system 100 according to the present embodiment, each of the plurality of BMI devices 10 inserts the invalid information into the brain information in accordance with the transmission speed that is set by the setting unit 23. According to this configuration, it is possible to easily adjust the transmission speed in the case where there is a difference between the processing capacities of the users with respect to the pieces of respective brain information.

In the brain information transmission system 100 according to the present embodiment, the brain information is information related to a plurality of senses each of which provides a stimulus to the brain of each of the users, and each of the plurality of BMI devices 10 multiplexes and synchronizes the pieces of information provided by the plurality of senses. According to this configuration, it is possible to efficiently transmit the brain information including the information provided by the plurality of senses.

In the brain information transmission system 100 according to the present embodiment, each of the plurality of BMI devices 10 acquires the processing capacity of the respective users when the intention conveyance is started. According to this configuration, each of the BMI devices 10 is able to acquire the processing capacities of the other users.

The technical scope of the present disclosure is not limited to the embodiment described above and various modifications are possible as long as they do not depart from the spirit of the present disclosure. For example, in the above described embodiment, a case has been described as one example in which a sense of hearing stimulus is provided to the user when the processing capacity of the user with respect to the brain information is calculated, but the embodiment is not limited to this. For example, as a stimulus provided to the user, the processing capacity may be calculated by providing a stimulus corresponding to the sense recalled by the user.

Furthermore, in the above described embodiment, a case has been described as one example in which each of the BMI devices 10 calculates the processing capacity, but the embodiment is not limited to this. For example, the configuration may be constituted such that the control device 20 transmits a common stimulus to each of the BMI devices 10, each of the BMI devices 10 acquires the degree of activity and transmits the acquired degree of activity to the control device 20, and the processing capacity of each of the users is calculated in the control device 20 on the basis of the degree of activity that is transmitted from each of the BMI devices 10.

Figure 8A:
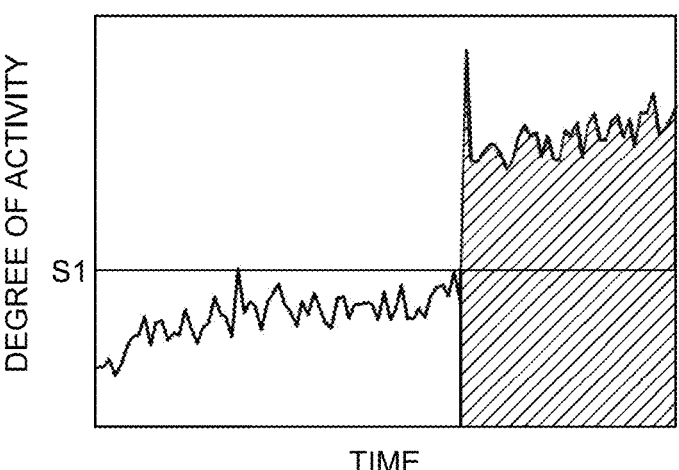
FIG. 8 is a diagram illustrating another example of an operation of adjusting a transmission speed.
Figure 8B:
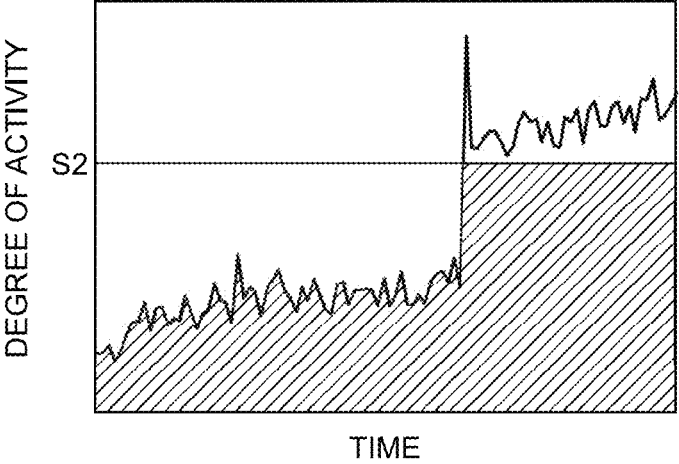

Furthermore, in the above described embodiment, a case has been described as one example in which the invalid information is inserted into the brain information when the transmission speed is adjusted, but the embodiment is not limited to this, and the entire transmission speed of the brain information may be adjusted by transmitting only a part of the brain information. FIG. 8 is a diagram illustrating another example of an operation of adjusting the transmission speed. FIG. 8 (*a*) and FIG. 8 (*b*) illustrate the relationship between the degree of activity of the brain information and the time, and the vertical axis indicates the degree of activity, whereas the horizontal axis indicates the time.

As illustrated in FIG. 8 (*a*), the BMI device 10 is able to extract, for example, a portion in which the value of the degree of activity is equal to or larger than a threshold S1 included in the brain information (the hatched area in FIG. 8 (*a*)), and table to transmit the extracted portion. In other words, the BMI device 10 is able to thin out and transmit a portion in which the value of the degree of activity is less than the threshold S1 included in the brain information. It can be said that the portion in which the degree of activity is high included in the brain information is the portion having a high intensity of a sense, an emotion, or the like recalled by the user. Consequently, by extracting or thinning out the information by using the threshold S1 of the degree of activity, it is possible to transmit a rough sense except for a detailed portion and share the brain information with the other users while suppressing an amount of transmission of the brain information.

Furthermore, as illustrated in FIG. 8 (*b*), the BMI device 10 is able to extract, for example, a portion in which the value of the degree of activity is equal to or less than a threshold S2 included in the brain information (the hatched area in FIG. 8 (*b*)), and is able to transmit the extracted portion. In other words, the BMI device 10 is able to thin out and transmit a portion in which the value of the degree of activity exceeds the threshold S2 included in the brain information. Furthermore, in the example illustrated in FIG. 8 (*b*), a change in the amplitude at the portion equal to or larger than the threshold S2 is smoothened, but the configuration is not limited to this, and the entire portion may be smoothened. In this way, by extracting or thinning out the information by using the threshold S2 of the degree of activity, it is possible to transmit a sense except for a sensitive responded portion and share the brain information with the other users while suppressing an amount of transmission of the brain information.

Furthermore, in the above description, as an example of the transmission operation of transmitting only a portion of the brain information in accordance with the set transmission speed, a configuration in which the information is extracted or thinned out by using the threshold of the degree of activity in the brain information has been described, but the embodiment is not limited to this. It may be possible to extract and thin out the information by using another mode.

Furthermore, in the above described, the stimulus providing unit 15 may irradiates the target portion of the brain of the user with an electromagnetic wave signal, and may recall an intention, an emotion, and a sense by using a method other than the method of activating the target portion. It may be possible to recall the stimulus information on a sense of sight, a sense of hearing, a sense of touch, a sense of taste, a sense of smell, a somatic sensation, or the like by a device that provides each of the senses. For example, a display that provides an image corresponding to the stimulus information on a sense of sight, a speaker that provide voice corresponding to the stimulus information on a sense of hearing, and the like may be used. It may be possible to provide a stimulus of a sense of hearing stimulus pulse that is used to measure the processing capacity of the user with respect to the brain information to the ears of the user from a sound emitting device, such as a speaker or headphones.

According to the present disclosure, it is possible to appropriately grasp the processing capacity of each of the users with respect to the brain information in the case where intention conveyance is performed among the plurality of users on the basis of the brain information.

The brain information transmission system according to the present disclosure is able to be used for, for example, a processing device, such as a computer.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A brain information transmission system including comprising:

a plurality of brain-machine interface (BMI) devices configured to be mounted on a plurality of users, respectively, wherein a first BMI device, of the BMI devices, mounted on a first user is configured to convey an intention of the first user to a second user, via a second BMI device of the BMI devices mounted on the second user, based on brain information;

a stimulus providing unit configured to provide a common stimulus to the first BMI device and the second BMI device; and a processing unit configured to calculate respective processing capacities of the first user and the second user with respect to the brain information based on a degree of activity of a brain of each of the first user and the second user indicated when the common stimulus is provided to the brain of each of the first user and the second user.

2. The brain information transmission system according to claim 1, further comprising a setting unit configured to set, based on the processing capacities of the first user and the second user with respect to the brain information, a transmission speed of the brain information transmitted among the first BMI device and the second BMI device.

3. The brain information transmission system according to claim 2, wherein at least one of the first BMI device or the second BMI device is configured to insert invalid information into the brain information in accordance with the transmission speed that is set by the setting unit.

4. The brain information transmission system according to claim 2, wherein at least one of the first BMI device or the second BMI device is configured to transmit a portion of the brain information less than a total amount of the brain information in accordance with the transmission speed that is set by the setting unit.

5. The brain information transmission system according to claim 2, wherein the brain information is information about a plurality of senses each of which provides a stimulus to the brain of each of the plurality of users, and each of the plurality of BMI devices is configured to multiplex and synchronize pieces of information provided by the plurality of senses.

6. A brain information transmission method performed in a brain information transmission system including a plurality of brain-machine interface (BMI) devices configured to be mounted on a plurality of users, respectively, the brain information transmission method comprising:

conveying, by a first BMI device of the plurality of BMI devices mounted on a first user of the plurality of users, an intention of the first user to a second BMI device mounted on a second user of the plurality of users based on brain information;

providing, a common stimulus to the first BMI device and the second BMI device; and calculating respective processing capacities of the first user and the second user with respect to the brain information based on a degree of activity of a brain of each of the first user and the second user indicated in response to the common stimulus being provided to the brain of each of the first user and the second user.

7. The brain information transmission system according to claim 1, wherein each of the BMI devices uses the brain information of a user, of the plurality of users, as the intention of the user to be conveyed.

\* \* \* \* \*